United States Patent [19]
Brooks et al.

[11] Patent Number: 5,311,671
[45] Date of Patent: May 17, 1994

[54] APPARATUS FOR RECOVERING DRY CLEANING FLUID

[76] Inventors: Floyd L. Brooks, 1901 N. Redwood; James E. Gilchrist, Box 234, both of, Canby, Oreg. 97013

[21] Appl. No.: 36,039

[22] Filed: Mar. 23, 1993

[51] Int. Cl.⁵ ............................................. F26B 19/00
[52] U.S. Cl. ................................... 34/66; 34/73; 34/394; 134/31
[58] Field of Search ............... 34/73, 12, 13, 60, 66, 34/13; 134/31; 210/791

[56] References Cited

U.S. PATENT DOCUMENTS

| | | | |
|---|---|---|---|
| 4,443,344 | 4/1984 | Lewis | 210/774 |
| 4,444,625 | 4/1984 | Smith | 203/95 |
| 4,500,363 | 2/1985 | Roehl | 134/10 |
| 4,793,938 | 12/1988 | Dayton | 210/774 |
| 4,885,099 | 12/1989 | Kelly | 210/771 |
| 4,898,601 | 2/1990 | Casey | 55/341 R |

Primary Examiner—Denise Gromada
Attorney, Agent, or Firm—Chernoff, Vilhauer, McClung & Stenzel

[57] ABSTRACT

Apparatus for recovering from a filter element a dry cleaning fluid, the vapor of which is more dense than air, is disclosed. The apparatus comprises a chamber, a support for a filter cartridge, a heating element, and a cooling element located below the heating element.

6 Claims, 2 Drawing Sheets

APPARATUS FOR RECOVERING DRY CLEANING FLUID

BACKGROUND OF THE INVENTION

This invention relates to apparatus for recovering a dry cleaning fluid, the vapor of which is more dense than air, from a filter element such as a filter cartridge.

During the dry cleaning process, as garments and other items are cleaned in a dry cleaning machine, the dry cleaning fluid is continuously circulated through a filter to remove lint, dyes, dirt and other contaminants from the fluid. Most dry cleaning machines use a cartridge filter system and the most commonly used dry cleaning fluid is perchloroethylene (perc). When the filter cartridges will no longer filter contaminants from the dry cleaning fluid they are removed and replaced. The spent filter cartridges contain the filtered contaminants and are saturated with dry cleaning fluid.

State and federal regulations require that dry cleaning fluids and cartridges containing the same be handled as a hazardous waste and thus encourage the recovery, cleaning and reuse of contaminated or dirty dry cleaning fluid. Disposal of the dry cleaning fluid as a hazardous waste, and the cost of that disposal, are based on the total weight of the waste. Accordingly, it is desirable to recover and reuse as much of the residual dry cleaning fluid as possible before disposing of a spent filter cartridge.

Casey U.S. Pat. No. 4,898,601 discloses an aftercooker apparatus for the recovery of dry cleaning fluid that requires plumbing into the dry cleaning machine and into compressed air and steam lines which, in turn, require an air compressor and a boiler for steam generation.

Dayton U.S. Pat. No. 4,793,938 discloses a dry cleaning fluid-recovery apparatus which cannot be used without modifying the dry cleaning machine and which cannot function without sources of live steam, compressed air, and cold water.

Smith U.S. Pat. No. 4,444,625, Lewis U.S. Pat. No. 4,443,344, Roehl U.S. Pat. No. 4,500,363, and Kelly U.S. Pat. No. 4,885,099 all disclose systems for recovering used dry cleaning fluid by generating a steam/dry cleaning vapor mixture. Thus, each of these systems requires a separate condenser in addition to a source of steam generation.

None of these known recovery systems can be installed in a dry cleaning establishment without extensive modifications to the dry cleaning machine itself or without plumbing separate apparatus into live steam lines. The known systems which can operate independent of the dry cleaning machine also require the operation of boilers, condensers, and compressors.

What is still needed, therefore, is an efficient, economically operated apparatus in which the dry cleaning fluid contained in a filter element can be vaporized and condensed for recovery in a simple closed system.

SUMMARY OF THE INVENTION

The present invention overcomes the foregoing shortcomings of the prior art by providing self-contained apparatus for recovering a dry cleaning fluid, the vapor of which is more dense than air, from a filter element containing the dry cleaning fluid. The apparatus includes a chamber having a support for supporting a filter element containing the dry cleaning fluid. A heating element is located proximate the support for heating and vaporizing the liquid dry cleaning fluid. A cooling element is located in the chamber below the heating element for cooling and condensing the vaporized dry cleaning fluid to a liquid condensate. The dry cleaning fluid is typically perc; perc vapor is more dense than air, so that as the liquid perc fluid is heated and vaporized, the vapor sinks to a lower level in the chamber. Because of the cooling element located below the heating element, the temperature in the chamber varies from high temperature proximate the heating element to a low temperature proximate the cooling element. As the perc vapor descends to a lower elevation in the chamber a temperature is reached at which the perc vapor condenses.

In a preferred embodiment of the present invention, a reservoir, in fluid communication with the chamber, receives the liquid condensate. A baffle may be located between the heating element and the cooling element to deflect the heat rays of the heating element.

The apparatus of the present invention is made operational merely by plugging it into an electrical outlet to provide electrical energy for operating the heating and cooling elements. In addition, the apparatus operates completely independently of the dry cleaning machine.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
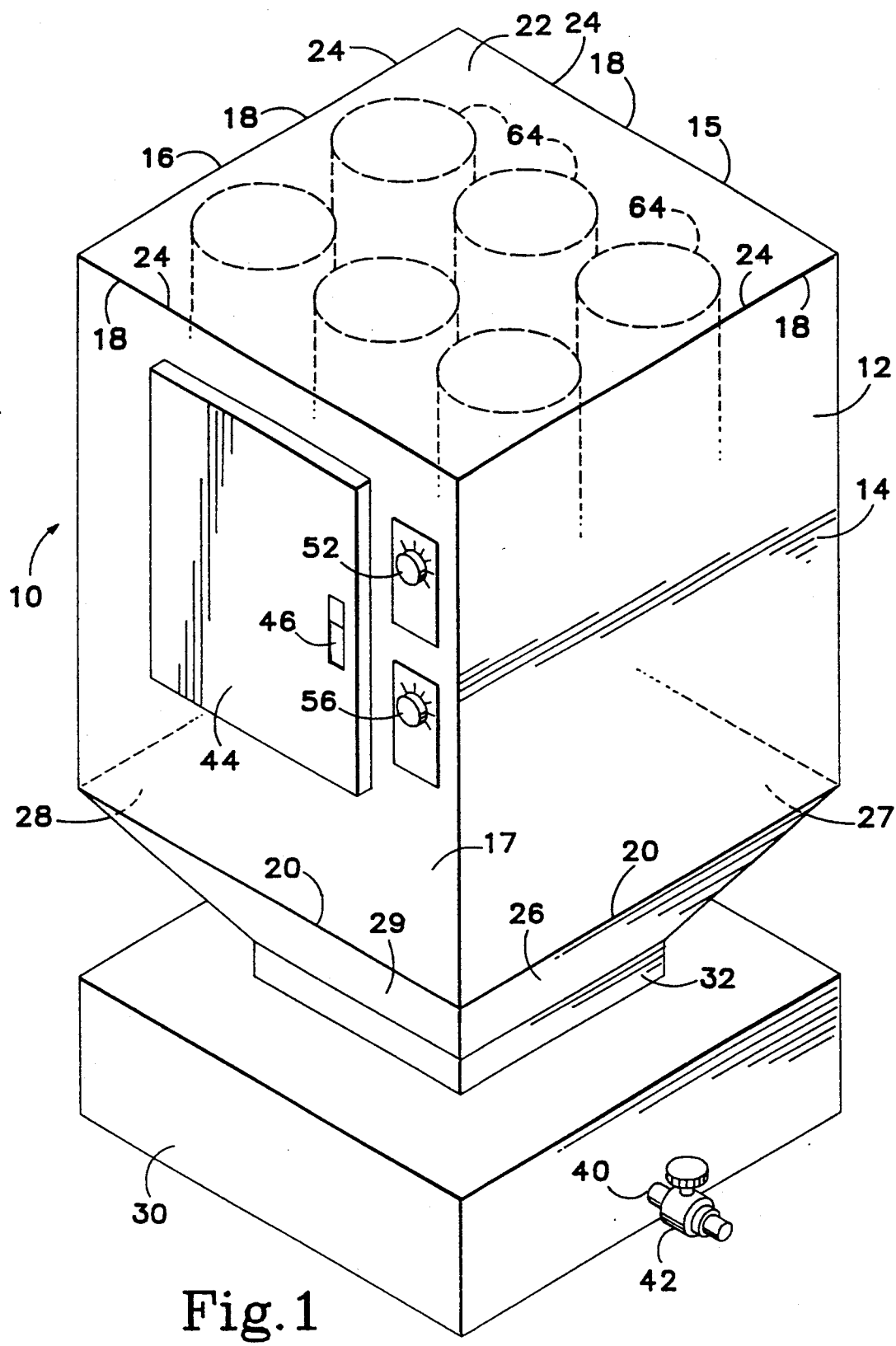
FIG. 1 is a perspective view of apparatus embodying the present invention for recovering dry cleaning fluid with parts of the filter elements shown in phantom.
Figure 2:
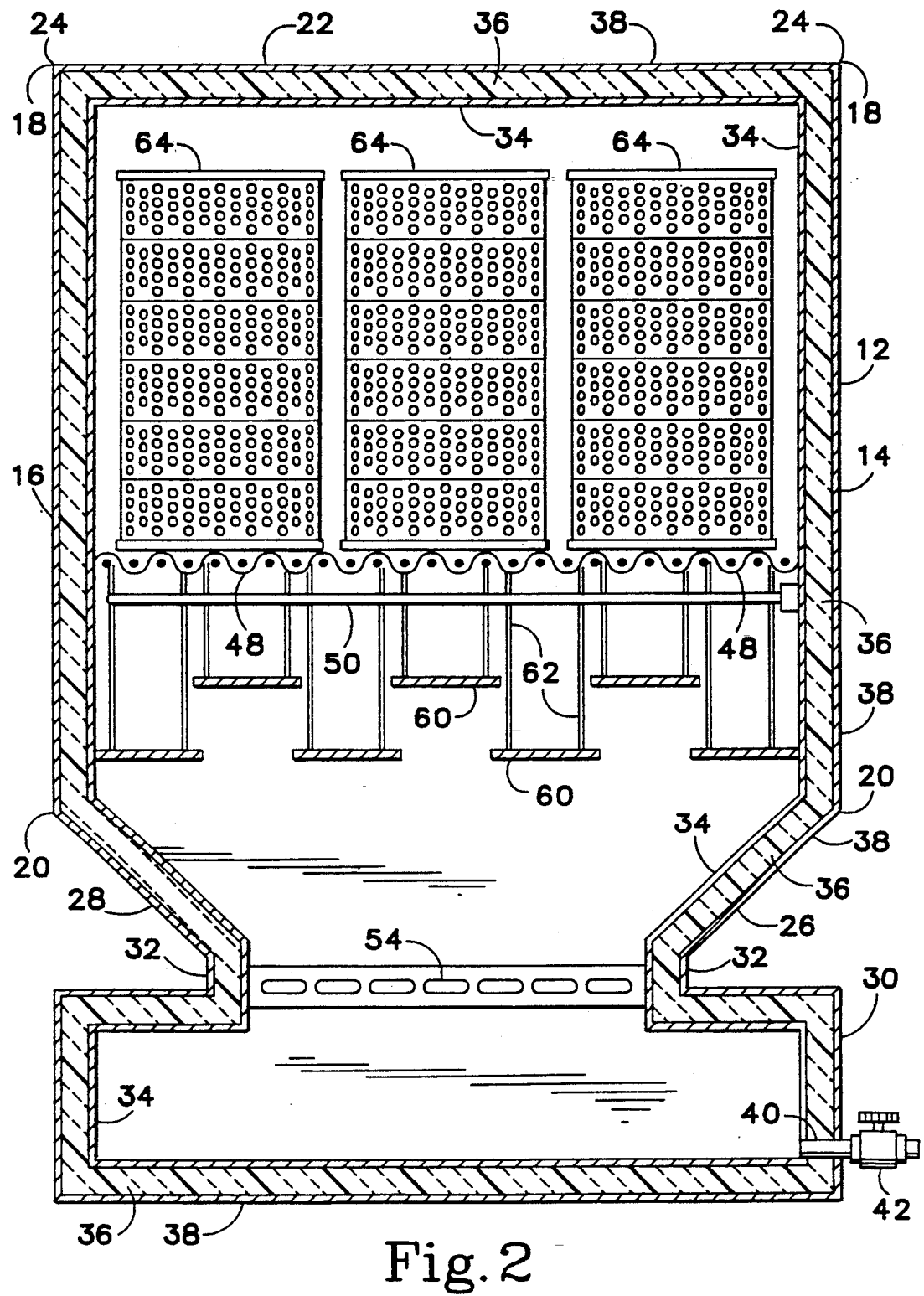
FIG. 2 is a sectional view of the apparatus of FIG. 1 shown with filter cartridge filter elements.

Referring now to the drawings, an apparatus for recovering dry cleaning fluid is shown in FIGS. 1 and 2. The apparatus 10 includes a chamber 12 having four side walls 14, 15, 16, 17, each side wall 14–17 defining a top margin 18 and a bottom margin 20. A top wall 22 has four edge margins 24 each of which attaches continuously to the respective top margin 18 of each side wall. Sloping walls 26, 27, 28, 29 attach to the respective bottom margin 20 of each side wall 14–17 and extend slopingly inward and downward toward a reservoir 30. The sloping walls 26–29 and the reservoir 30 are connected by a duct 32. An opening 40 in the reservoir is closed by a valve 42.

The chamber 12, the reservoir 30, and the duct 32 are preferably composed of three layers 34, 36, and 38. The first or inner layer 34 is preferably a material such as steel which does not react with the dry cleaning fluid to be recovered. The second or middle layer 36 is an insulating material. The third or outer layer 38 is a metal such as steel and may be finished, for example, by painting.

A door 44 is located in the wall 17 of the chamber 12 and includes a latch 46 for sealingly closing the chamber. A second access panel (not shown) may be provided, if desired, to aid in servicing the apparatus.

The size of the chamber 12 is determined by the nature and size of the filter elements containing the dry cleaning fluid. The filter elements are typically standard filter cartridges such as the Puritan filter cartridges manufactured by R. R. Street & Co., Inc. of Oak Brook, Ill. These standard cartridges are about 7¾ inches in diameter and 14½ inches long. Thus, for example, for a dry cleaning machine employing six such filter cartridges in each of two filter banks, apparatus embodying the present invention would conveniently include a chamber having dimensions suitable for accommodating six such used filter cartridges. It will be understood that other filter elements such as filter bags or larger sized filter cartridges may also be employed with the present invention.

As shown in FIG. 2, a support such as a perforated shelf or a grating 48 is located in the chamber 12. A heat source, for example, a heating element such as a heating coil 50 is located proximate the support, and, in a preferred embodiment, may be located immediately below the grating 48. A thermostat 52 for controlling the temperature of the heating coil 50 is mounted on the chamber 12. A cooling element, such as a refrigeration or cooling coil 54, is located in the chamber 12 at an elevation lower than the elevation of the heating element, and in a preferred embodiment, is located in the duct 32 connecting the chamber 12 and the reservoir 30. A second thermostat 56 for controlling the temperature of the cooling coil 54 is also mounted on the chamber 12. Each thermostat 52, 56 is connected to its respective heating or cooling coil by a suitable electrical connection (not shown).

In a preferred embodiment, at least one baffle 60 is located between the heating coil 50 and the cooling coil 54, as shown in FIG. 2. Each baffle 60, which may be mounted in the chamber by any convenient method, is suspended from the grating 48 by wire suspension elements 62. The baffles 60 thus generally define a separation of the heating/vaporizing portion of the chamber from the cooling/condensing portion of the chamber. The baffle may be constructed from any material which will not react with the dry cleaning fluid and which will serve as a heat-reflective surface such as stainless steel.

The temperature of the heating coil may be adjusted within a range of about 100°-160° F. With a heating coil temperature at the lower end of this range, the time required for the complete recovery of the dry cleaning fluid contained in the filter cartridges will be extended. The highest temperature in the heating coil is determined by the minimum temperature required to vaporize all the recoverable dry cleaning fluid in the filter element. When the dry cleaning fluid is perc, a preferred heating coil temperature range is 125°-150° F., and a maximum temperature of about 150° F. is sufficient for the desired perc recovery. The heating coil temperature may be adjusted over the total recovery time, for example, by initially using a lower heating coil temperature when the filters are very wet, and increasing the heating coil temperature as the amount of dry cleaning fluid remaining in the filter cartridges decreases. It may be desirable to include a vent (not shown) in the chamber 12, connectible to the dry cleaning machine, to prevent an undesirable increase in pressure in the chamber if the initial heating temperature is too high. The temperature of the cooling coil may be adjusted within a range of between about 20°-40° F., preferably to between about 25°-35° F., and most preferably to about 30° F.

To operate the apparatus, filter elements such as used filter cartridges 64 which contain dry cleaning fluid such as perc are placed on the grating 48 in the chamber 12. The door 44 of the chamber 12 is closed and latched, thus sealing the chamber. The respective thermostats 52, 56 are set to provide the desired temperatures in the heating and cooling coils. For example, to recover perc from six standard filter cartridges 64, the temperature of the heating coil 50 is initially 125° F. and the temperature of the cooling coil 54 is 30° F. After about two days the temperature in the heating coil 50 is increased to about 150° F., while the temperature in the cooling coil 54 remains about 30° F., and the recovery continues for a total recovery time of about four days.

During the recovery period, the liquid perc in the filter cartridges is heated and thereby vaporized. Perc vapor is more dense than air and settles, therefore, toward the bottom of the chamber. As the perc vapor approaches the cooling element in the chamber its temperature decreases. The perc vapor cools and condenses to a liquid condensate which collects in the reservoir 30. The valve 42 in the reservoir can be opened to drain the recovered perc condensate from the reservoir. The recovered perc can be returned to the dry cleaning machine or, if desired, further purified by distillation. The dried filter cartridges are removed for proper disposal. Approximately 13½ lbs. or about one gallon of perc is recoverable from each standard filter cartridge.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for recovering a dry cleaning fluid, the vapor of which is more dense than air, comprising:
   (a) a chamber;
   (b) a support, located at a first position in said chamber, for supporting a filter element containing a liquid dry cleaning fluid;
   (c) heating means, located proximate said support in said chamber, for heating and vaporizing said liquid dry cleaning fluid in said filter element to form a vaporized dry cleaning fluid; and
   (d) cooling means, located in said chamber at a second position, said second position being below said first position, for cooling and condensing said vaporized dry cleaning fluid to a liquid condensate in said chamber,
   wherein said support, said heating means, and said cooling means are all located in the same chamber.

2. The apparatus of claim 1, including a reservoir in fluid communication with said chamber for receiving said liquid condensate therein.

3. The apparatus of claim 2 wherein said cooling means is located proximate said reservoir.

4. The apparatus of claim 1, including a baffle located between said heating means and said cooling means.

5. The apparatus of claim 1 wherein said filter element is a filter cartridge.

6. The apparatus of claim 1 wherein said dry cleaning fluid is perchloroethylene.

* * * * *